DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 2, 1974

921 O.G. 10

T921,005

POLYESTER GEL COATS

Francis J. Sheme, 529 Fulton Ave. 37660, and Saundra L. Hillman, Rte. 13, 4422 Harbor Drive 37664, both of Kingsport, Tenn.

Filed Apr. 2, 1973, Ser. No. 347,091

Int. Cl. C08g *31/06, 47/10*

U.S. Cl. 260—827

No Drawing. 9 Pages Specification

Silicone modified unsaturated polyesters are prepared by reacting polyesters, the glycol component of which is at least 50 mole percent neopentyl glycol, 2,2,4-trimethylpentane-1,3-diol or 1,4-cyclohexanedimethanol with a silicone compound of the general formula

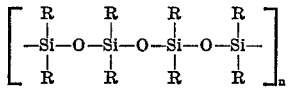

wherein at least one R is hydroxy or alkoxy from $C_1$ to $C_{10}$ and the remaining R's are hydrogen or other organic radicals having from 1–40 carbon atoms, and $n$ is an integer sufficient to result in a molecular weight of from 500 to 1000.

The silicone modified polyesters are blended with polymerizable vinyl monomers to form gel coats having good physical properties.